US012600856B2

(12) United States Patent
Nishino et al.

(10) Patent No.: US 12,600,856 B2
(45) Date of Patent: Apr. 14, 2026

(54) RESIN COMPOSITION, FORMED ARTICLE, AND, FORMED ARTICLE WITH HARD COAT LAYER

(71) Applicant: MITSUBISHI CHEMICAL CORPORATION, Tokyo (JP)

(72) Inventors: Yohei Nishino, Hiratsuka (JP); Sawa Yoshida, Hiratsuka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 544 days.

(21) Appl. No.: 18/040,157

(22) PCT Filed: Sep. 24, 2021

(86) PCT No.: PCT/JP2021/035025
§ 371 (c)(1),
(2) Date: Feb. 1, 2023

(87) PCT Pub. No.: WO2022/071102
PCT Pub. Date: Apr. 7, 2022

(65) Prior Publication Data

US 2023/0265284 A1 Aug. 24, 2023

(30) Foreign Application Priority Data

Sep. 30, 2020 (JP) ................................ 2020-165415

(51) Int. Cl.
*C08L 69/00* (2006.01)
*C08K 7/14* (2006.01)
*C09D 169/00* (2006.01)

(52) U.S. Cl.
CPC ................ *C08L 69/00* (2013.01); *C08K 7/14* (2013.01); *C09D 169/00* (2013.01); *C08L 2205/025* (2013.01); *C08L 2205/03* (2013.01)

(58) Field of Classification Search
CPC .......... C08L 69/00; C08K 7/14; C09D 169/00
See application file for complete search history.

(56) References Cited

U.S. PATENT DOCUMENTS

| | | | | |
|---|---|---|---|---|
| 5,510,414 | A | 4/1996 | Okamoto et al. | |
| 2010/0316860 | A1 | 12/2010 | Isozaki et al. | |
| 2013/0216801 | A1* | 8/2013 | Kadoki ................. | C08G 64/06 427/164 |
| 2014/0155548 | A1 | 6/2014 | Kurokawa et al. | |
| 2015/0210851 | A1 | 7/2015 | Tajima | |

FOREIGN PATENT DOCUMENTS

| | | | |
|---|---|---|---|
| CN | 101522806 | A | 9/2009 |
| CN | 103649225 | A | 3/2014 |
| CN | 111108152 | A | 5/2020 |
| EP | 0 567 655 | A1 | 11/1993 |
| EP | 3 699 233 | A1 | 8/2020 |
| JP | 5-179119 | A | 7/1993 |
| JP | 2012-246343 | A | 12/2012 |
| JP | 2013-71958 | A | 4/2013 |
| JP | 2020-29481 | A | 2/2020 |

OTHER PUBLICATIONS

Combined Chinese Office Action and Search Report issued Nov. 11, 2023 in Chinese Patent Application No. 202180048333.X (with English Translation of Office Action only), citing references 15-16 and 18 therein, 15 pages.
Extended European Search Report issued Mar. 15, 2024 in European Patent Application No. 21875404.2, citing documents 1 and 15 therein, 7 pages.
International Search Report and Written Opinion issued Nov. 22, 2021 in PCT/JP2021/035025 (with English Translation of Category of Cited Documents), citing references 1 and 15-18 therein, 9 pages.
International Preliminary Report on Patentability and Written Opinion issued Nov. 22, 2021 in PCT/JP2021/035025 (with English Translation of Written Opinion), citing references 1 and 15-18 therein, 7 pages.

* cited by examiner

*Primary Examiner* — John E Uselding
(74) *Attorney, Agent, or Firm* — Oblon, McClelland, Maier & Neustadt, L.L.P.

(57) ABSTRACT

To provide a resin composition that excels both in transparency and mechanical strength, as well as a formed article, and a formed article with hard coat layer. The resin composition contains 5 to 100 parts by mass of a glass filler, per 100 parts by mass of a resin component, the resin component containing 40 to 85 parts by mass of a polycarbonate resin that contains a structural unit represented by Formula (1), and 15 to 60 parts by mass of a thermoplastic resin other than the polycarbonate resin, the resin component and the glass filler demonstrating an absolute difference in refractive index of 0.0042 or smaller, and the resin component demonstrating a coefficient of dynamic friction, measured in compliance with ISO 19252, of 0.40 or smaller:

In Formula (1), $R^1$ represents a methyl group.

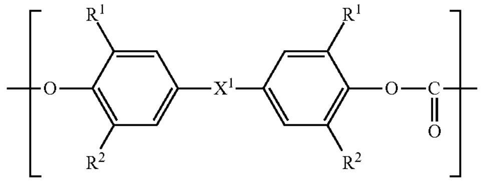

20 Claims, No Drawings

RESIN COMPOSITION, FORMED ARTICLE, AND, FORMED ARTICLE WITH HARD COAT LAYER

CROSS-REFERENCE TO RELATED APPLICATIONS

The present application is the national stage of international application PCT/JP2021/035025, filed on Sep. 24, 2021, and claims the benefit of the filing date of Japanese Appl. No. 2020-165415, filed on Sep. 30, 2020, the content of each of which is incorporated by reference.

TECHNICAL FIELD

This invention relates to a resin composition, a formed article, and a formed article with hard coat layer, and, particularly to a resin composition that contains a polycarbonate resin as a major component.

BACKGROUND ART

Polycarbonate resin, which is a thermoplastic resin that excels in impact resistance, heat resistance and transparency, enjoys wide use in automobile interior panel; automobile headlight lens; and enclosures for mobile phone, personal digital assistance, liquid crystal display television, and personal computer. The polycarbonate resin is also used for automobile window and so forth, since it excels over inorganic glass in terms of lightness and productivity.

In recent years, efforts have been made to improve the transparency of the polycarbonate resin, while improving the mechanical strength, by blending a glass filler.

For example, Patent Literature 1 discloses an aromatic polycarbonate resin composition that contains 1 to 100 parts by mass of a E-glass reinforcing material (C), per 100 parts by mass of a resin component that contains 60 to 85% by mass of an aromatic polycarbonate resin (A) having a mass-average molecular weight of 15,000 to 40,000, and 15 to 40% by mass of a (meth)acrylate copolymer (B) having a mass ratio (b1/b2) of an aromatic (meth)acrylate unit (b1) and a methyl methacrylate unit (b2) of (5 to 50)/(50 to 95), and a mass-average molecular weight of 5,000 to 30,000.

CITATION LIST

Patent Literature

[Patent Literature 1] JP 2012-246343 A

SUMMARY OF THE INVENTION

Technical Problem

As described above, the effort has been made to improve the transparency of the polycarbonate resin, while improving the mechanical strength, by blending the glass filler. It is, however, difficult to keep the transparency while improving the mechanical strength by blending the glass filler to the polycarbonate resin. More specifically, the polycarbonate resin when blended with the glass filler, might improve the mechanical strength, but degrades the transparency due to scattering of light, which is ascribed to difference of refractive index between the polycarbonate resin and the glass filler. The polycarbonate resin blended with the glass filler also degrades the transparency, since the glass filler will be present on the surface of an obtainable formed article, to roughen the surface of the formed article.

Aiming at solving the issue, this invention is to provide a resin composition that excels both in transparency and mechanical strength, as well as a formed article, and a formed article with hard coat layer.

Solution to Problem

The present inventors addressed the above-mentioned problems and discovered that the above problems could be solved by blending other thermoplastic resin with the polycarbonate resin, thereby shortening refractive index between the polycarbonate resin and the glass filler, and lowering a coefficient of dynamic friction of the resin component.

Specifically, the problems described above are solved by the following means.

<0> A resin composition containing a resin component and a glass filler, the resin component containing a polycarbonate resin that contains a structural unit represented by Formula (1), and a thermoplastic resin other than the polycarbonate resin, the resin component and the glass filler demonstrating an absolute difference in refractive index of 0.0042 or smaller, and the resin component demonstrating a coefficient of dynamic friction, measured in compliance with ISO 19252, of 0.40 or smaller:

Formula (1)

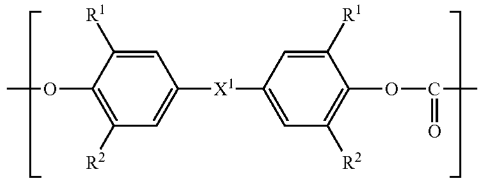

(in Formula (1), $R^1$ represents a methyl group, $R^2$ represents a hydrogen atom or a methyl group, and $X^1$ represents either group represented by the formulae below,

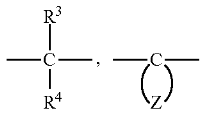

where, each of $R^3$ and $R^4$ independently represents a hydrogen atom or a methyl group, and Z represents a group that combines with C to form an optionally-substituted alicyclic hydrocarbon group having 6 to 12 carbon atoms.)

<1> A resin composition containing 5 to 100 parts by mass of a glass filler, per 100 parts by mass of a resin component, the resin component containing 40 to 85 parts by mass of a polycarbonate resin that contains a structural unit represented by Formula (1), and 15 to 60 parts by mass of a thermoplastic resin other than the polycarbonate resin, the resin component and the glass filler demonstrating an absolute difference in refractive index of 0.0042 or smaller, and the resin component demonstrating a coefficient of dynamic friction, measured in compliance with ISO 19252, of 0.40 or smaller:

Formula (1)

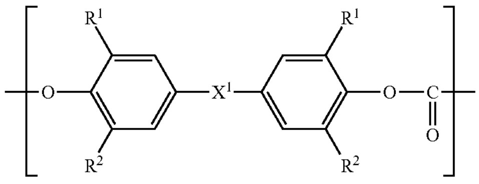

(in Formula (1), $R^1$ represents a methyl group, $R^2$ represents a hydrogen atom or a methyl group, and $X^1$ represents either group represented by the formulae below,

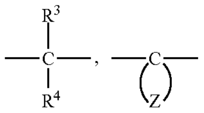

where, each of $R^3$ and $R^4$ independently represents a hydrogen atom or a methyl group, and Z represents a group that combines with C to form an optionally-substituted alicyclic hydrocarbon group having 6 to 12 carbon atoms.)

<2> The resin composition of <1>, wherein the polycarbonate resin further contains a structural unit represented by Formula (2)

Formula (2)

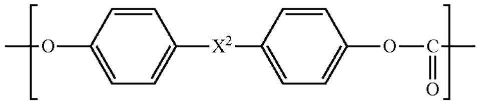

(in Formula (2), $X^2$ represent either group represented by the formulae below:

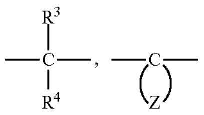

where, each of $R^3$ and $R^4$ independently represents a hydrogen atom or a methyl group, and Z represents a group that combines with C to form an optionally-substituted alicyclic hydrocarbon group having 6 to 12 carbon atoms.)

<3> The resin composition of <1> or <2>, wherein the thermoplastic resin other than the polycarbonate resin has a refractive index of 1.4900 to 1.5500.

<4> The resin composition of any one of <1> to <3>, wherein a ratio of the structural unit represented by Formula (1), in the resin component, is 15% by mass or larger.

<5> The resin composition of any one of <1> to <4>, wherein the thermoplastic resin is a (meth)acrylate polymer.

<6> The resin composition of <5>, wherein the (meth) acrylate polymer contains an aromatic (meth)acrylate unit (b1).

<7> The resin composition of <5>, wherein the (meth) acrylate polymer contains an aromatic (meth)acrylate unit (b1) and a methyl methacrylate unit (b2), with a mass ratio (b1/b2) of (5 to 50)/(50 to 95).

<8> The resin composition of any one of <1> to <7>, wherein the glass filler contains a glass fiber having an oblate cross section.

<9> The resin composition of any one of <1> to <8>, demonstrating a dielectric loss tangent, measured by the perturbation method at 1 GHz frequency, of 0.0060 or smaller.

<10> The resin composition of any one of <1> to <9>, further containing 10 to 100 parts by mass of a glass filler, per 100 parts by mass of the resin component, wherein the resin component contains 16 to 40 parts by mass of the thermoplastic resin other than the polycarbonate resin, relative to the total of the polycarbonate resin and the thermoplastic resin assumed to be 100 parts by mass.

<11> A formed article formed of the resin composition described in any one of <1> to <10>.

<12> The formed article of <11>, being a display utensil, a personal digital assistant component, an electric home appliance, or, interior furniture.

<13> A formed article with hard coat layer, having a hard coat layer on at least a part of the formed article described in <11> or <12>.

Advantageous Effects of Invention

This invention is the first to provide a resin composition that excels both in transparency and mechanical strength, as well as a formed article, and a formed article with hard coat layer.

DESCRIPTION OF EMBODIMENTS

Embodiments for carrying out the invention (simply referred to as "this embodiment", hereinafter) will be detailed below. The embodiments below are merely illustrative, so that this invention is not limited solely to these embodiments.

Note that all numerical ranges given in this patent specification, with "to" preceded and succeeded by numerals, are used to represent the ranges including these numerals respectively as the lower and upper limit values.

Various physical properties and characteristic values mentioned herein are those demonstrated at 23° C., unless otherwise specifically noted.

"(Meth)acrylate", herein means either acrylate or methacrylate, or, both of them.

The resin composition of this embodiment contains 5 to 100 parts by mass of a glass filler, per 100 parts by mass of a resin component,

- the resin component contains 40 to 85 parts by mass of a polycarbonate resin that contains a structural unit represented by Formula (1), and 15 to 60 parts by mass of a thermoplastic resin other than the polycarbonate resin,
- the resin component and the glass filler demonstrate an absolute difference in refractive index of 0.0042 or smaller, and
- the resin component demonstrates a coefficient of dynamic friction, measured in compliance with ISO 19252, of 0.40 or smaller:

Formula (1)

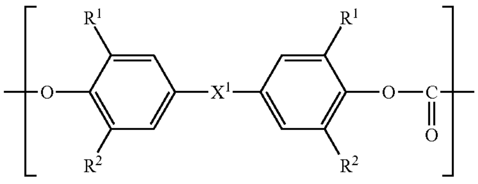

(in Formula (1), $R^1$ represents a methyl group, $R^2$ represents a hydrogen atom or a methyl group, and $X^1$ represents either group represented by the formulae below,

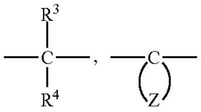

where, each of $R^3$ and $R^4$ independently represents a hydrogen atom or a methyl group, and Z represents a group that combines with C to form an optionally-substituted alicyclic hydrocarbon group having 6 to 12 carbon atoms.)

With such structure, the resin composition that excels in transparency and mechanical strength is obtainable. This is presumed as follows. That is, blending of the glass filler to the resin component might improve the mechanical strength of the obtainable formed article. However, a large difference of refractive index between the polycarbonate resin and the glass filler was anticipated to degrade the transparency of the obtainable resin composition. Now, this embodiment succeeded in improving the transparency, presumably as a result of blending of a polycarbonate resin having high transparency, blending of a thermoplastic resin having a refractive index smaller than that of the glass filler, and control of difference of the refractive index between the resin component and the glass fiber in the resin composition within a predetermined range. Also with the coefficient of dynamic friction of the resin component controlled to 0.40 or smaller, the glass filler presumably becomes more likely to intrude into the resin component, thus effectively suppressing the light scattering ascribed to the surface roughness.

With the aforementioned structure, this embodiment also successfully obtains the resin composition that demonstrates good formability, high surface hardness, and low dielectric loss tangent.

<Resin Component>

The resin composition of this embodiment contains a resin component. The resin component contains a polycarbonate resin that contains a structural unit represented by Formula (1), and a thermoplastic resin other than the polycarbonate resin. With the thermoplastic resin (normally, a resin having a refractive index smaller than that of polycarbonate) blended to the polycarbonate resin, the resin component may have the refractive index closer to that of the glass filler.

In this embodiment, the resin component demonstrates a coefficient of dynamic friction, measured in compliance with ISO 19252, of 0.40 or smaller. With the coefficient of dynamic friction of the resin component controlled to 0.40 or smaller, the glass filler becomes more likely to intrude into the resin component, thus effectively suppressing the light scattering ascribed to the surface roughness.

Formula (1)

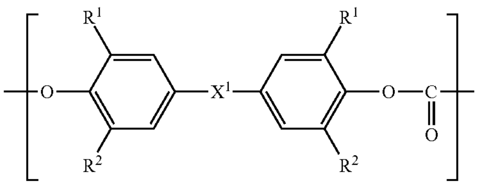

In Formula (1), $R^1$ represents a methyl group, $R^2$ represents a hydrogen atom or a methyl group, and $X^1$ represents either group represented by the formulae below:

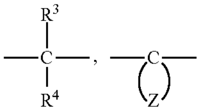

where, each of $R^3$ and $R^4$ independently represents a hydrogen atom or a methyl group, and Z represents a group that combines with C to form an optionally-substituted alicyclic hydrocarbon group having 6 to 12 carbon atoms.

<<Coefficient of Dynamic Friction>>

The resin component of this embodiment demonstrates a coefficient of dynamic friction, measured in compliance with ISO 19252, of 0.40 or smaller. With the coefficient of dynamic friction of the resin component controlled to 0.40 or smaller, the glass filler becomes more likely to intrude into the resin component, thus effectively suppressing the light scattering ascribed to the surface roughness.

The coefficient of dynamic friction is preferably 0.39 or smaller, more preferably 0.37 or smaller, even more preferably 0.36 or smaller, yet more preferably 0.35 or smaller, furthermore preferably 0.34 or smaller, and again furthermore preferably 0.33 or smaller. The lower limit value of the coefficient of dynamic friction is practically, but not restrictively, 0.01 or above. Even a lower limit value of 0.20 or above may be enough for satisfying performance requirement.

<<Content of Resin Component>>

The content of the resin component in the resin composition of this embodiment (the total content of the polycarbonate resin and the other thermoplastic resin) is preferably 10% by mass or more in the resin composition, more preferably 59% by mass or more, even more preferably 60% by mass or more, yet more preferably 70% by mass or more, and particularly may be 75% by mass or more. At or above the lower limit value, the formed article formed of the resin composition tends to have further improved impact strength and heat resistance. The upper limit value of the content is preferably 95% by mass or below in the resin composition, from the viewpoint of the surface hardness of the formed article and fluidity of the resin composition, which is more preferably 91% by mass or below, even more preferably 90% by mass or below, and yet more preferably 85% by mass or below.

In the resin composition of this embodiment, the total content of the polycarbonate resin and the (meth)acrylate polymer preferably falls within any of the aforementioned ranges.

<<Refractive Index of Resin Component>>

The refractive index of the resin component in the resin composition of this embodiment is typically 1.5942 or smaller, may be 1.5930 or smaller, and particularly 1.5920 or smaller. Meanwhile, the refractive index of the resin component is typically 1.5458 or larger, may be 1.5470 or larger, and particularly 1.5480 or larger. The refractive index is measured according to the description later in EXAMPLES.

<Polycarbonate Resin>>

The polycarbonate resin used in this embodiment contains the structural unit represented by Formula (1). With the structural unit represented by Formula (1) contained therein, the resin component may have higher transparency. Moreover, the obtainable formed article may have increased surface hardness. The obtainable formed article may also have lowered dielectric loss tangent.

Formula (1)

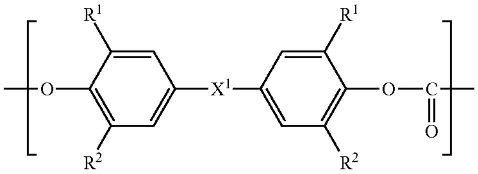

In Formula (1), $R^1$ represents a methyl group, $R^2$ represents a hydrogen atom or a methyl group, and $X^1$ represents either group represented by the formulae below:

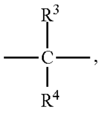,

where, each of $R^3$ and $R^4$ independently represents a hydrogen atom or a methyl group, and Z represents a group that combines with C to form an optionally-substituted alicyclic hydrocarbon group having 6 to 12 carbon atoms.

The alicyclic hydrocarbon group formable as a result of combination of Z and C is exemplified by cycloalkylidene group such as cyclohexylidene group, cycloheptylidene group, cyclododecylidene group, adamantylidene group, and cyclododecylidene group. The substituted alicyclic hydrocarbon formable as a result of combination of Z and C is exemplified by methyl-substituted, and ethyl-substituted products of the aforementioned alicyclic hydrocarbon groups. Among them, preferred are cyclohexylidene group, methyl-substituted product of cyclohexylidene group (preferably 3,3,5-trimethyl-substituted product), and cyclododecylidene group.

When $X^1$ in Formula (1) represents the group below:

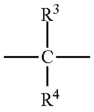

preferably at least either $R^3$ or $R^4$ represents a methyl group, and more preferably both of them represent a methyl group.

Meanwhile, when $X^1$ represents the group below:

Z combines with C which is bound to two phenyl groups in Formula (1), to form a divalent alicyclic hydrocarbon group having 6 to 12 carbon atoms. The divalent alicyclic hydrocarbon group is exemplified by cycloalkylidene group such as cyclohexylidene group, cycloheptylidene group, cyclododecylidene group, adamantylidene group, and cyclododecylidene group. The substituted product is exemplified by those having methyl substituent or ethyl substituent. Among them, preferred are cyclohexylidene group, methyl-substituted product of cyclohexylidene group (preferably 3,3,5-trimethyl-substituted product), and cyclododecylidene group.

$X^1$ in Formula (1) preferably represents the structure below:

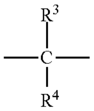

Preferred example of the structural unit represented by Formula (1) is specifically exemplified by 2,2-bis(4-hydroxyphenyl)propane, that is, a structural unit constituted by bisphenol A (carbonate structural unit).

In this embodiment, the polycarbonate resin may contain only one kind of, or two or more kinds of the structural unit represented by Formula (1).

In this embodiment, the polycarbonate resin further preferably contains a structural unit represented by Formula (2) With the structural unit represented by Formula (2) contained therein, the polycarbonate resin may have further improved heat resistance Formula (2)

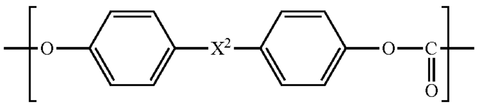

In Formula (2), $X^2$ represents either group represented by the formulae below:

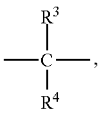,

where, each of $R^3$ and $R^4$ independently represents a hydrogen atom or a methyl group, and Z represents a group that combines with C to form an optionally-substituted alicyclic hydrocarbon group having 6 to 12 carbon atoms.

When $X^2$ in Formula (2) represents the group below:

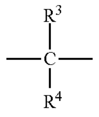

preferably at least either $R^3$ or $R^4$ represents a methyl group, and more preferably both of them represent a methyl group.

Meanwhile, when $X^2$ represents the group below:

Z combines with C which is bound to two phenyl groups in Formula (2), to form a divalent alicyclic hydrocarbon group having 6 to 12 carbon atoms. The divalent alicyclic hydrocarbon group is exemplified by cycloalkylidene group such as cyclohexylidene group, cycloheptylidene group, cyclododecylidene group, adamantylidene group, and cyclododecylidene group. The substituted product is exemplified by those having methyl substituent or ethyl substituent. Among them, preferred are cyclohexylidene group, methyl-substituted product of cyclohexylidene group (preferably 3,3,5-trimethyl-substituted product), and cyclododecylidene group.

$X^2$ in Formula (2) preferably represents the structure below:

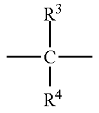

In this embodiment, the polycarbonate resin may contain only one kind of, or two or more kinds of the structural unit represented by Formula (2).

In this embodiment, the polycarbonate resin may contain other structural unit, other than the structural unit represented by Formula (1) or Formula (2). Such other structural unit is exemplified by those derived from dihydroxy compounds enumerated below.

Bis(4-hydroxyphenyl)methane, 2,2-bis(4-hydroxyphenyl) butane, 2,2-bis(4-hydroxyphenyl)pentane, 2,2-bis(4-hydroxyphenyl)-4-methylpentane, 2,2-bis(4-hydroxy-3-methylphenyl)propane, 2,2-bis(4-hydroxy-3,5-dimethylphenyl)propane, 2,2-bis(4-hydroxy-3-(1-methylethyl)phenyl)propane, 2,2-bis(4-hydroxy-3-tert-butylphenyl) propane, 2,2-bis(4-hydroxy-3-(1-methylpropyl)phenyl) propane, 2,2-bis(4-hydroxy-3-cyclohexylphenyl)propane, 2,2-bis(4-hydroxy-3-phenylphenyl)propane, 1,1-bis(4-hydroxyphenyl)decane, 1,1-bis(4-hydroxyphenyl)cyclohexane, 1,1-bis(4-hydroxyphenyl)-1-phenylethane, 1,1-bis(4-hydroxyphenyl)phenylmethane, 1,1-bis(4-hydroxy-3-methylphenyl)cyclohexane, 1,1-bis(4-hydroxy-3,5-dimethylphenyl)cyclohexane, 1,1-bis (4-hydroxy-3-(1-methylethyl)phenyl)cyclohexane, 1,1-bis (4-hydroxy-3-tert-butylphenyl)cyclohexane, 1,1-bis(4-hydroxy-3-(1-methylpropyl)phenyl)cyclohexane, 1,1-bis(4-hydroxy-3-cyclohexylphenyl)cyclohexane, 1,1-bis(4-hydroxy-3-phenylphenyl)cyclohexane, 1,1-bis(4-hydroxy-3-methylphenyl)-1-phenylethane, 1,1-bis(4-hydroxy-3,5-dimethylphenyl)-1-phenylethane, 1,1-bis(4-hydroxy-3-(1-methylethyl)phenyl)-1-phenylethane, 1,1-bis(4-hydroxy-3-tert-butylphenyl)-1-phenylethane, 1,1-bis(4-hydroxy-3-(1-methylpropyl)phenyl)-1-phenylethane, 1,1-bis(4-hydroxy-3-cyclohexylphenyl)-1-phenylethane, 1,1-bis(4-hydroxy-3-phenylphenyl)-1-phenylethane, 1,1-bis(4-hydroxyphenyl) cyclopentane, 1,1-bis(4-hydroxyphenyl)cyclooctane, 4,4'-(1,3-phenylenediisopropylidene)bisphenol, 4,4'-(1,4-phenylenediisopropylidene)bisphenol, 9,9-bis(4-hydroxyphenyl) fluorene, 9,9-bis(4-hydroxy-3-methylphenyl)fluorene, 4,4'-dihydroxybenzophenone, 4,4'-dihydroxyphenyl ether, 4,4'-dihydroxybibiphenyl, 1,1-bis(4-hydroxyphenyl)-3,3,5-trimethylcyclohexane, 1,1-bis(4-hydroxy-6-methyl-3-tert-butylphenyl)butane.

An embodiment of such other structural unit may also be understood referring to a structural unit represented by Formula (2) in paragraph [0008] of WO2017/099226, description in paragraphs [0043] to [0052] of WO2017/099226, and description of JP 2011-046769 A, the contents of which are incorporated herein by reference.

In the polycarbonate resin used in this embodiment, the ratio of the structural unit represented by Formula (1) is preferably 15% by mass or larger, more preferably 20% by mass or larger, even more preferably 35% by mass or larger, yet more preferably 45% by mass or larger, furthermore preferably 50% by mass or larger, again furthermore preferably 70% by mass or larger, and particularly preferably 80% by mass or larger. At or above the lower limit value, the obtainable formed article tends to further improve the transparency, to enhance the surface hardness, and to lower the dielectric loss tangent. The ratio of the structural unit represented by Formula (1) is more preferably 95% by mass or smaller, more preferably 90% by mass or smaller, and may even be 84% by mass or smaller. At or below the upper limit value, the deflection temperature under load tends to further elevate.

In the polycarbonate resin used in this embodiment, the total of the structural units represented by Formula (1) and Formula (2) preferably accounts for 90% by mass or more of all structural units exclusive of the terminal group, more preferably accounts for 95% by mass or more, and even more preferably accounts for 99% by mass or more. The upper limit of the total is 100% by mass or below.

The polycarbonate resin used in this embodiment preferably applies to any of the modes below:

(A1) a polycarbonate resin that contains the structural unit represented by Formula (1);

(A2) a blend of a polycarbonate resin that contains the structural unit represented by Formula (1), with the structural unit represented by Formula (2);

(A3) a polycarbonate resin that contains the structural unit represented by Formula (1), and the structural unit represented by Formula (2);

(A4) a blend of a polycarbonate resin that contains the structural unit represented by Formula (1), with a polycarbonate resin that contains the structural unit represented by Formula (1) and the structural unit represented by Formula (2);

(A5) a blend of a polycarbonate resin that contains the structural unit represented by Formula (2), with a polycarbonate resin that contains the structural unit represented by Formula (1) and the structural unit represented by Formula (2);

(A6) a blend of a polycarbonate resin that contains the structural unit represented by Formula (1), with a polycarbonate resin that contains the structural unit represented by Formula (2), and with a polycarbonate resin that contains the structural unit represented by Formula (1) and the structural unit represented by Formula (2);

(A7) the polycarbonate resin described in any one of (A1) to (A6), in which the polycarbonate resin or the polycarbonate resin that composes the blend thereof contains other structural unit other than the structural unit represented by Formula (1) and the structural unit represented by Formula (2); and (A8) a blend of the polycarbonate resin or the blend thereof described in (A1) to (A7), with a polycarbonate resin composed of other structural unit.

The polycarbonate resin used in this embodiment typically has a refractive index of 1.5600 or larger, which is specifically 1.5700 or larger, and particularly 1.5800 or larger. Meanwhile, the upper limit value of the refractive index of the polycarbonate resin is preferably 1.6500 or below, more preferably 1.6400 or below, even more preferably 1.6300 or below, yet more preferably 1.6200 or below, and furthermore preferably 1.6100 or below.

The refractive index is measured according to the description later in EXAMPLES. In a case where two or more kinds of the polycarbonate resin are contained, the refractive index is defined by the refractive index of the mixture.

The polycarbonate resin used in this embodiment preferably has the viscosity-average molecular weight (Mv), whose lower limit value is preferably 5,000 or above, more preferably 8,000 or above, even more preferably 10,000 or above, and yet more preferably 12,000 or above. Meanwhile, the upper limit value of My is preferably 32,000 or below, more preferably 30,000 or below, even more preferably 29,000 or below, and yet more preferably 27,000 or below.

With the viscosity-average molecular weight controlled at or above the aforementioned lower limit value, the formability will improve, and the obtainable formed article may have high mechanical strength. Meanwhile, at or below the upper limit value, the resin composition may have improved fluidity, and will enable efficient manufacture of a thin-walled formed article.

In a case where the resin composition contains two or more kinds of the polycarbonate resin, the values of the viscosity-average molecular weight of the individual polycarbonate resins are multiplied by the respective mass fractions and summed up, to determine the overall viscosity-average molecular weight.

In particular, the polycarbonate resin that contains the structural unit represented by Formula (1) preferably has a viscosity-average molecular weight of 20,000 to 30,000, which is more preferably 20,000 to 28,000. Meanwhile, the polycarbonate resin that contains the structural unit represented by Formula (2) preferably has a viscosity-average molecular weight of 12,000 to 28,000, which is more preferably 18,000 to 27,000.

The viscosity-average molecular weight (Mv) is measured according to the description later in EXAMPLES.

The polycarbonate resin used in this embodiment (all polycarbonate resins including the structural unit represented by Formula (1) and the structural unit represented by Formula (2)) typically has a pencil hardness, measured in compliance with ISO 15184, of 3B to 2H, which is more preferably 2B to 2H. The pencil hardness is measured according to the description later in EXAMPLES.

In particular, the polycarbonate resin that contains the structural unit represented by Formula (1) preferably has a pencil hardness of H to 2H, meanwhile, the polycarbonate resin that contains the structural unit represented by Formula (2) preferably has a pencil hardness of 2B to HB.

Method for manufacturing the polycarbonate resin used in this embodiment may be understood typically, but not restrictively, referring to the description in paragraphs [0027] to [0043] and EXAMPLES of JP 2014-065901 A, the contents of which are incorporated herein by reference.

<<Thermoplastic Resin Other Than Polycarbonate Resin>>

The resin component contains a thermoplastic resin other than the polycarbonate resin. With such other thermoplastic resin (usually, resin whose refractive index is smaller than that of the polycarbonate resin) contained therein, the resin component will have low refractive index.

Such a thermoplastic resin other than the polycarbonate resin is usually selected, without special limitation, from those having the refractive index smaller than those of the polycarbonate resin and glass filler. More specifically, such a thermoplastic resin (preferably (meth)acrylate polymer, described later) preferably has a refractive index of 1.5500 or smaller, which is more preferably 1.5400 or smaller, even more preferably 1.5300 or smaller, and yet more preferably 1.5250 or smaller. The lower limit value of the refractive index of the thermoplastic resin is preferably 1.4900 or above, more preferably 1.5000 or above, and even more preferably 1.5100 or above. At or above the lower limit value, the formed article formed of the resin composition may have further enhanced surface hardness.

The other thermoplastic resin is exemplified by (meth) acrylate polymer, acrylonitrile-styrene copolymer (AS resin), methyl methacrylate-styrene copolymer (MS resin), polystyrene resin, polyamide resin, polyethylene terephthalate resin, polybutylene terephthalate resin, polyallylate resin, polysulfone resin, and polyphenylene sulfide resin, wherein (meth)acrylate polymer is preferred. In particular, with the (meth)acrylate polymer contained therein, the formed article formed of the resin composition may have enhanced surface hardness, and the resin composition may have enhanced fluidity.

The (meth)acrylate polymer used in this embodiment preferably contains an aromatic (meth)acrylate unit (b1), and preferably contains the aromatic (meth)acrylate structural unit (b1) and a methyl methacrylate structural unit (b2). With the aromatic (meth)acrylate structural unit (b1) contained therein, the compatibility with the polycarbonate resin may improve, meanwhile with the methyl methacrylate structural unit (b2) contained therein, the formed article formed of the resin composition may have enhanced surface hardness.

The aromatic (meth)acrylate (b1), which is a monomer that composes the aromatic (meth)acrylate structural unit, means (meth)acrylate having aromatic group. The aromatic (meth)acrylate (b1) is preferably (meth)acrylate having benzene ring and/or naphthalene ring, and is more preferably (meth)acrylate having benzene ring. The aromatic (meth) acrylate (b1) is specifically exemplified by phenyl (meth) acrylate, biphenyl (meth)acrylate, and benzyl (meth)acrylate. Among them, preferred are phenyl methacrylate and benzyl methacrylate, and more preferred is phenyl methacrylate.

The (meth)acrylate polymer may contain only one kind of, or two or more kinds of the aromatic (meth)acrylate unit (b1).

A monomer that composes the methyl methacrylate structural unit (b2) is methyl methacrylate.

In a case where the (meth)acrylate polymer used in this embodiment contains the aromatic (meth)acrylate structural unit (b1) and the methyl methacrylate structural unit (b2), the mass ratio (b1)/(b2) is preferably (5 to 80)/(95 to 20). The mass ratio (b1)/(b2) is more preferably (5 to 50)/(50 to 95), even more preferably (25 to 50)/(50 to 75), yet more preferably (25 to 45)/(55 to 75), and furthermore preferably (30 to 40)/(60 to 70).

The (meth)acrylate polymer used in this embodiment, when containing the aromatic (meth)acrylate structural unit (b1) and the methyl methacrylate structural unit (b2), may further contain other structural unit, but not necessarily. Such other structural unit, when contained, is preferably styrene structural unit, or, (meth)acrylate structural unit other than (b1) and (b2), and is more preferably (meth) acrylate structural unit other than (b1) and (b2). The (meth) acrylate structural unit other than (b1) and (b2) is exemplified by aliphatic (meth)acrylate other than methyl methacrylate.

In the (meth)acrylate polymer used in this embodiment, the total of the aromatic (meth)acrylate structural unit (b1) and the methyl methacrylate structural unit (b2) preferably accounts for 90% by mass or more of all structural units exclusive of the terminal group, more preferably accounts for 95% by mass or more, and even more preferably accounts for 99% by mass or more. The upper limit of the total may be 100% by mass or below of structural units exclusive of the terminal group.

The (meth)acrylate polymer used in this embodiment preferably has a weight-average molecular weight of 5,000 or larger, which is more preferably 10,000 or larger, and even more preferably 13,000 or larger. At or above the lower limit value, the obtainable formed article may tend to have improved impact strength and heat resistance. Meanwhile, the (meth)acrylate polymer preferably has a weight-average molecular weight of 30,000 or smaller, which is more preferably 25,000 or smaller, even more preferably 20,000 or smaller, and yet more preferably 16,000 or smaller. At or below the lower limit value, the resin composition tends to have further improved fluidity.

The weight-average molecular weight of the (meth)acrylate polymer is measured according to the description later in EXAMPLES.

The pencil hardness of the (meth)acrylate polymer used in this embodiment, measured in compliance with ISO 15184, is 2H or harder. The upper limit value is practically 4H or softer, although not specifically limited. With use of the (meth)acrylate polymer whose pencil hardness is 2H or harder, the obtainable formed article may have improved surface hardness.

In a case where the resin composition of this embodiment contains two or more kinds of the (meth)acrylate polymer, the pencil hardness of the mixture preferably falls in any of the aforementioned ranges.

The pencil hardness is measured according to the description later in EXAMPLES.

The (meth)acrylate polymer used in this embodiment, other than those described above, is selectable from those described in WO2014/038500, WO2013/094898, JP 2006-199774 A, JP 2010-116501 A, JP 2014-065901 A, JP 2016-27068 A, and “aromatic (meth)acrylate” described in JP 2016-47937 A, the contents of which are incorporated herein by reference.

In the resin composition of this embodiment, the content of the polycarbonate resin, per 100 parts by mass of the resin component (preferably assuming the total of the polycarbonate resin and the other thermoplastic resin as 100 parts by mass), is 40 parts by mass or more, preferably 50 parts by mass or more, more preferably 60 parts by mass or more, even more preferably 68 parts by mass or more, yet more preferably 70 parts by mass or more, furthermore preferably 72 parts by mass or more, again furthermore preferably 75 parts by mass or more, and even may be 76 parts by mass or more. At or above the lower limit value, the formed article formed of the resin composition tends to further improve the impact strength, and the resin composition tends to effectively suppress the heat resistance from degrading. Meanwhile, the content of the polycarbonate resin in the resin composition of this embodiment, per 100 parts by mass of the resin component (preferably assuming the total of the polycarbonate resin and the other thermoplastic resin as 100 parts by mass), is 85 parts by mass or less, and may even be 84 parts by mass or less. At or below the upper limit value, the formed article formed of the resin composition tends to have further improved surface hardness, and, the resin composition tends to further improve the fluidity.

In the resin composition of this embodiment, the content of the other thermoplastic resin (preferably (meth)acrylate polymer), per 100 parts by mass of the resin component (preferably assuming the total of the polycarbonate resin and the other thermoplastic resin as 100 parts by mass), is 15 parts by mass or more, and even may be 16 parts by mass or more. At or above the lower limit value, the formed article formed of the resin composition tends to improve the surface hardness, and, the resin composition tends to have improved fluidity. Meanwhile, the content of the other thermoplastic resin (preferably (meth)acrylate polymer) in the resin composition of this embodiment, per 100 parts by mass of the resin component (preferably assuming the total of the polycarbonate resin and the other thermoplastic resin as 100 parts by mass), is 60 parts by mass or less, preferably 50 parts by mass or less, more preferably 40 parts by mass or less, even more preferably 32 parts by mass or less, yet more preferably 30 parts by mass or less, furthermore preferably 28 parts by mass or less, again furthermore preferably 25 parts by mass or less, and even may be 24 parts by mass or less. At or below the upper limit value, the formed article formed of the resin composition tends to have further improved impact strength, and the resin composition tends to effectively suppress the heat resistance from degrading.

<Glass Filler>

The resin composition of this embodiment contains a glass filler. With the glass filler contained therein, the obtainable formed article may have improved mechanical strength.

To the glass filler in this embodiment, fillers having been used for reinforcing thermoplastic resins are widely applicable without special limitation.

The refractive index of the glass filler used for this embodiment is typically 1.5500 or larger, specifically 1.5600 or larger, and particularly 1.5700 or larger. Meanwhile, the refractive index of the glass filler is typically 1.5900 or smaller, specifically 1.5850 or smaller, and particularly 1.5800 or smaller. The refractive index is measured according to the description later in EXAMPLES.

In a case where the resin composition contains two or more kinds of the glass filler, the values of the refractive index of the individual glass fibers are multiplied by the respective mass fractions and summed up to determine the overall refractive index.

The glass filler used in this embodiment may have any shape such as fibrous, plate-like, and bead-like. The fibrous shape is preferred.

The glass filler used in this embodiment, when having the fibrous shape, preferably has a number-average fiber length (cut length) of 0.5 to 10.0 mm, which is more preferably 1.0 to 5.0 mm. With use of the glass filler (glass fiber) having such number-average fiber length, the mechanical strength may further improve. The glass fiber having a number-average fiber length (cut length) of 0.5 to 10.0 mm is exemplified by those marketed as chopped strand. The number-average fiber length is determined on an image observed under an optical microscope, by randomly sampling the glass fibers whose fiber length will be determined, then measuring the length of the long sides, and by averaging the measured values. The observation is made at 20× magnification, while sampling 1000 or more fibers. The number average fiber length is approximately equivalent to the cut length.

The glass fiber may have any cross-sectional shape selected from circle, oval, oblong circle, rectangle, rectangle combined with semicircles on both short sides, cocoon and so forth. The glass fiber in this embodiment preferably has an oblate cross section, preferably with an oblateness of 1.5 to 8, and more preferably with an oblateness of 2 to 6. With use of such oblate glass fiber, the light scattering may be effectively suppressed, and the obtainable formed article may have further improved transparency.

The lower limit of the number-average fiber diameter of the glass fiber is preferably 4.0 μm or above, more preferably 4.5 μm or above, and even more preferably 5.0 μm or above. The upper limit of the number-average fiber diameter of the glass filler is preferably 15.0 μm or below, and more preferably 12.0 μm or below. Note that the number average fiber diameter of the glass fiber can be determined on an image observed under an electron microscope, by randomly sampling the glass fibers whose diameter will be determined, then by measuring the diameter at the near center of the fiber, and by averaging the measured values. The observation is made at 1,000× magnification, while sampling 1,000 or more fibers. The number average fiber diameter of the glass fiber, having a cross-sectional shape other than circle, is determined after converting the cross sectional area into a circle having an equal area.

Next, the glass fiber preferably used in this embodiment will be explained.

The glass fiber used herein may be any fiber melt-spun from commonly marketed glasses such as E-glass, C-glass, A-glass, S-glass, D-glass, R-glass, and M-glass, which are not specifically limited so long as they can be spun into glass fiber. In this embodiment, E-glass is preferably contained.

The glass fiber used in this embodiment is preferably surface-treated with a surface treatment agent which is typically a silane coupling agent such as γ-metacryloxypropyl trimethoxysilane, γ-glycidoxypropyl trimethoxysilane, or γ-aminopropyl triethoxysilane. Amount of adhesion of the surface treatment agent is preferably 0.01 to 1% by mass of the glass fiber. Other glass fibers usable here include those optionally surface-treated with lubricant such as aliphatic amide compound or silicone oil, antistatic agent such as quaternary ammonium salt, film-forming resin such as epoxy resin or urethane resin, and mixture of film-forming resin with heat stabilizer, flame retardant and so forth. The glass fiber used in this embodiment may be sized with a sizing agent. The sizing agent in this case is preferably epoxy-based sizing agent or urethane-based sizing agent.

The glass fiber is commercially available, and is exemplified by T-187, T-286H, T-756H, T-289H from Nippon Electric Glass Co., Ltd.; DEFT2A from Owens Corning; HP3540 from PPG Industries, Inc.; and CSG3PA820 from Nitto Boseki Co., Ltd.

The content of the glass filler (preferably glass fiber) in the resin composition of this embodiment, per 100 parts by mass of the resin component, is 5 parts by mass, preferably 10 parts by mass or more, and even more preferably 15 parts by mass or more. At or above the lower limit value, the obtainable formed article tends to further improve the mechanical strength. Meanwhile, the content of the glass filler (preferably glass fiber) in the resin composition of this embodiment, per 100 parts by mass of the resin component, is 100 parts by mass or less, preferably 90 parts by mass or less, more preferably 80 parts by mass or less, and even more preferably 70 parts by mass or less. At or below the upper limit value, the fluidity during injection molding tends to improve.

The content of the glass filler (preferably glass fiber) in the resin composition of this embodiment is preferably 5% by mass or more, more preferably 9% by mass or more, even more preferably 10% by mass or more, and yet more preferably 15% by mass or more. Meanwhile, the content of the glass filler (preferably glass fiber) is preferably 90% by mass or less, more preferably 41% by mass or less, even more preferably 40% by mass or less, yet more preferably 30% by mass or less, and particularly may be 25% by mass or less.

The resin composition of this embodiment may contain only one kind of, or two or more kinds of the glass filler. When two or more kinds are contained, the total content preferably falls within any of the aforementioned ranges.

<Other Components>

Besides the polycarbonate resin, the other thermoplastic resin (such as (meth)acrylate polymer), and the glass filler, the resin composition of this embodiment may optionally contain still other components other than those described above, without largely degrading the desired physical properties. Such other components are typically exemplified by various resin additives.

The resin additives are exemplified by mold releasing agent (such as ester compound), stabilizer (such as heat stabilizer, antioxidant), UV absorber, antistatic agent, flame retardant, flame retardant auxiliary, dye, pigment, anti-clouding agent, lubricant, anti-blocking agent, fluidity modifier, plasticizer, dispersion aid, and antibacterial agent. One kind of the resin additives may be contained, or two or more kinds may be contained according to freely selectable combination and ratio. Details of these additives may be understood referring to the description in paragraphs [0059] to [0080] of JP 2014-065901 A, the content of which is incorporated herein by reference.

The resin composition of this embodiment is prepared so that the content of the polycarbonate resin, the other thermoplastic resin (such as (meth)acrylate polymer), the glass filler, and the optional resin additive (such as ester compound, stabilizer) are added up to 100% by mass.

<<Mold Releasing Agent>>

The resin composition of this embodiment may contain a mold releasing agent. With the mold releasing agent contained therein, the mold releasability tends to further improve.

The mold releasing agent, to which any of known substances is applicable, is preferably ester compound, and more preferably ester compound formed between aliphatic alcohol (for example, saturated aliphatic monohydric alcohol having 16 to 22 carbon atoms, or polyhydric alcohol having 2 to 12 carbon atoms), and aliphatic carboxylic acid (for example, mono- or di-carboxylic acid having 16 to 22 carbon atoms). Details of the ester compound may be understood referring to the description in paragraphs [0047] to [0054] of JP 2020-029481 A, the content of which is incorporated herein by reference.

The content of the mold releasing agent (preferably ester compound), when contained in the resin composition of this embodiment, per 100 parts by mass of the resin component, is preferably 0.05 parts by mass or more, and more preferably 0.1 parts by mass or more. At or above the lower limit value, an effect of improving the mold releasability tends to be effectively demonstrated. Meanwhile, the upper limit value, per 100 parts by mass of the resin component, is preferably 2.2 parts by mass or below, may be 1.5 parts by mass or below, and even may be 1.0 parts by mass or below. At or below the upper limit value, a problematic dye pollution during injection molding, for example, may be effectively suppressed. Also the obtainable formed article tends to further improve the transparency.

The resin composition of this embodiment may contain only one kind of, or two or more kinds of the mold releasing agent. When two or more kinds are contained, the total content preferably falls within any of the aforementioned ranges.

<<Stabilizer>>

The stabilizer is exemplified by heat stabilizer and antioxidant.

For the heat stabilizer, phosphorus-containing stabilizer is preferably used.

The phosphorus-containing stabilizer usable herein may be any of known ones, which are exemplified by oxo acid of phosphorus such as phosphoric acid, phosphonic acid, phosphorous acid, phosphinic acid, and polyphosphoric acid; metal acid pyrophosphate such as sodium acid pyrophosphate, potassium acid pyrophosphate, and calcium acid pyrophosphate; phosphate salt of Group 1 or Group 2B metals such as potassium phosphate, sodium phosphate, cesium phosphate, and zinc phosphate; organophosphate compound, organophosphite compound, and organophosphonite compound. Organophosphite compound is particularly preferred.

For the antioxidant, hindered phenol-based stabilizer is preferably used.

The hindered phenol-based stabilizer is specifically exemplified by pentaerythritol tetrakis[3-(3,5-di-tert-butyl-4-hydroxyphenyl) propionate], octadecyl-3-(3,5-di-tert-butyl-4-hydroxyphenyl) propionate, thiodiethylenebis[3-(3,5-di-tert-butyl-4-hydroxyphenyl) propionate], N,N'-hexane-1,6-diylbis[3-(3,5-di-tert-butyl-4-hydroxyphenyl) propionamide], 2,4-dimethyl-6-(1-methylpentadecyl) phenol, diethyl[[3,5-bis(1,1-dimethylethyl)-4-hydroxyphenyl]methyl] phosphate, 3,3',3",5,5',5"-hexa-tert-butyl-a,a',a"-(mesitylene-2,4,6-triyl)tri-p-cresol, 4,6-bis(octylthiomethyl)-o-cresol, ethylenebis(oxyethylene)bis[3-(5-tert-butyl-4-hydroxy-m-tolyl) propionate], hexamethylenebis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazine-2-ylamino)phenol, and 2-[1-(2-hydroxy-3,5-di-tert-pentylphenyl)ethyl]-4,6-di-tert-pentylphenyl acrylate.

Such hindered phenol-based stabilizer is specifically exemplified by "Irganox (registered trademark, same will apply hereinafter) 1010", "Irganox 1076" from BASF SE; and "ADK STAB AO-50", and "ADK STAB AO-60" from ADEKA Corporation.

The content of the stabilizer in the resin composition of this embodiment, per 100 parts by mass of the resin component, is usually 0.001 parts by mass or more, preferably 0.005 parts by mass or more, more preferably 0.01 parts by mass or more, meanwhile, usually 1 part by mass or less, preferably 0.5 parts by mass or less, and more preferably 0.3 parts by mass or less. With the content of the stabilizer within any of these ranges, the effect of addition of the stabilizer is more effectively demonstrated.

The resin composition of this embodiment may contain only one kind of, or two or more kinds of the stabilizer. When two or more kinds are contained, the total content preferably falls within any of the aforementioned ranges.

<Difference of Refractive Index>

In this embodiment, an absolute difference of the refractive index between the resin component and the glass filler is adjusted to 0.0042 or smaller. With such structure, the obtainable formed article may have improved transmittance. The upper limit value of the difference of the refractive index is preferably 0.0041 or smaller, more preferably 0.0040 or smaller, even more preferably 0.0035 or smaller, yet more preferably 0.0030 or smaller, furthermore preferably 0.0028 or smaller, again furthermore preferably 0.0025 or smaller, and may preferably be 0.0020 or smaller, 0.0010 or smaller, 0.0009 or smaller, and 0.0008 or smaller. The lower limit value of the difference of refractive index of typically 0.0001 or above, and even 0.0003 or above will be enough for satisfying performance requirement, although ideally 0.

<Other Physical Properties>

The resin composition of this embodiment preferably excels in transparency. More specifically, the resin composition, when formed into a 2 mm thick flat specimen and measured at 23° C. in compliance with JIS K7105, preferably demonstrates a haze of 50% or smaller, which is more preferably 45% or smaller. The lower limit value of the haze is typically 5% or larger, and practically 10% or larger, although ideally 0%.

The resin composition of this embodiment preferably demonstrates large flexural modulus. More specifically, the resin composition of this embodiment, when formed into an ISO multi-purpose specimen (4 mm thick) and measured in compliance with ISO 178, preferably demonstrates a flexural modulus of 4500 MPa or larger, which is more preferably 5500 MPa or larger. The upper limit of the flexural modulus is not specifically limited. For example, performance requirement may be satisfied enough, even at or below 18000 MPa.

The resin composition of this embodiment preferably demonstrates high pencil hardness. More specifically, the resin composition, when formed into a 2 mm thick flat specimen, and measured in compliance with ISO 15184 with use of a pencil hardness tester under a 750 g load, preferably demonstrates a pencil hardness of H or harder, which is more preferably 2H or harder. The upper limit of the pencil hardness is practically 5H or below, although not specifically limited.

The resin composition of this embodiment preferably demonstrates low dielectric loss tangent. More specifically, the resin composition, when measured by the perturbation method at 1 GHz frequency, preferably demonstrates a dielectric loss tangent of 0.0060 or smaller, which is more preferably 0.0057 or smaller, even more preferably 0.0055 or smaller, yet more preferably 0.0053 or smaller, and furthermore preferably 0.0050 or smaller. The lower limit value is practically 0.0010 or above, although not specifically limited.

The haze, the flexural modulus, the pencil hardness, and the dielectric loss tangent are measured according to the methods described later in EXAMPLES.

<Method for Producing Resin Composition>

Method for producing the resin composition of this embodiment is not specifically limited, to which a wide variety of known methods for producing resin composition are applicable. An exemplary method is such as premixing the polycarbonate resin, the other thermoplastic resin, the glass filler, and the other optional component with use of any of various mixers such as tumbler and Henschel mixer, and then melt-kneading the mixture with use of a mixer such as Banbury mixer, roll mixer, Brabender mixer, single-screw kneader/extruder, twin-screw kneader/extruder, and kneader. Melt-kneading temperature is normally in the range from 240 to 320° C., although not specifically limited.

<Formed Article>

The formed article of this embodiment is formed of the resin composition of this embodiment. Hence, the formed article of this embodiment may have high transparency, and high mechanical strength.

The formed article may have any shape properly selectable according to application and purpose without special limitation, from various shapes including board-like, plate-like, rod-like, sheet-like, film-like, cylindrical, annular, circular, elliptic, polygonal, profiled, hollow, frame-like, box-like, panel-like, and other special shapes.

The formed article formed of the resin composition of this embodiment excels in transparency and mechanical strength, and is preferably used for example for display utensil, personal digital assistant component, electric home appliances, automobile component, railway axle component, aircraft component and interior furniture; and is more preferably used for display utensil, personal digital assistant component, electric home appliances, and interior furniture.

More specifically, preferred applications include window glass of architecture (building, housing, greenhouse, etc.); window glass of automobile, aircraft, and construction machine; roof of garage, arcade, etc.; sunroof, roof panel, sunshade; various inspection windows; lighting lens, traffic light lens, lens of optical instrument; lens cover; mirror, spectacles, goggles, windshield of motorcycle; solar cell cover; protective cover; various automobile covers for headlight, inner lens, rear lamp, etc.; automobile interior panel; display device cover, display panel component, amusement machine (Japanese slot machine, etc.) component; enclosure for electric/electronic equipment and QA equipment, including various mobile terminals (smartphone, tablet, wearable device), camera, and game machine; helmet; sheet, film, and laminate thereof.

This embodiment further discloses a formed article with hard coat layer, which is a formed article having a hard coat layer on at least a part of the surface.

The hard coat layer may only be formed at least on a part of the thermoplastic resin formed article of this invention. The formed article, when having a plate form, may have the hard coat layer either on one side or on both sides. On the other hand, the formed article, when having a box-form or the like, may have the hard coat layer only on one face, or on two or more faces, and preferably formed on two or more faces.

In this embodiment, the hard coat layer may be formed by coating a hard coat agent at least on a part of the surface of the formed article of this embodiment, and by hardening the agent according to a hardening scheme of the hard coat agent.

The hard coat agent for forming the hard coat layer may be any of known materials that are obtainable by dissolving various types of polyfunctional monomer or polyfunctional prepolymer as a major component, including silicone-based, acryl-based, epoxy-based, silazane-based, and urethane-based ones, together with inorganic filler such as silica, polymerization initiator and UV absorber into solvent, to which any of various additives such as antioxidant, photostabilizer, viscosity modifier, defoaming agent, antistatic agent, dispersion aid, slipping agent, dye and pigment may be optionally added. The hard coat agent may alternatively be a double-coating type agent aimed for enhanced adhesiveness or weatherability, needing provision of a primer layer before coating the hard coat agent.

When forming the hard coat layer, method for coating the hard coat agent is not specifically limited, and may be any method selectable from spray coating, dip coating, flow coating, spin coating, bar coating, curtain coating, mold coating, gravure coating, roll coating, blade coating and air knife coating.

Although the hard coat layer may be formed by coating, and then hardening, the hard coat agent on the surface of the formed article of this embodiment as described above, another method may be laminating a preliminarily formed film for use as the hard coat layer onto the formed article of this embodiment.

Still alternatively, a film for use as the hard coat layer may be preliminarily set in a die, and then injection-molding the resin composition of this embodiment, advantageously skipping a process for forming the hard coat layer after injection molding.

The thickness of the hard coat layer is preferably 5 to 50 μm, and more preferably 7 to 30 μm, from the viewpoint of enhancing the transparency, while preventing separation of the layer from the formed article of this embodiment due to difference of thermal expansion or difference of shrinkage.

Other information on the hard coat layer is obtainable referring to the description in paragraphs [0094] to [0097] of JP 2020-163597 A, the content of which is incorporated herein by reference.

The formed article with the hard coat layer of this embodiment successfully achieves high transparency, while maintaining various characteristics ascribed to blending of the glass filler, including high dimensional stability, rigidity (flexural strength), and heat resistance, as well as achieves sufficiently high surface hardness ascribed to the hard coat layer. The formed article with the hard coat layer is therefore suitably applicable to various products including camera, QA equipment, communication equipment, precision equipment, electric/electronic component, automobile component, and general machine component; and particularly suitable for camera, OA equipment, electric/electronic component, and automobile component for which the transparency is highly valued.

<Method for Manufacturing Formed Article>

The resin composition of this embodiment is pelletized, and then formed by any of various forming methods into a formed article. Alternatively, a non-pelletized resin may be melt-kneaded in an extruder, and then directly formed into a formed article.

Method for forming the formed article is selectable, without special limitation, from known forming methods which are exemplified by injection molding, injection compression molding, extrusion molding, profile extrusion, transfer molding, hollow molding, gas assisted hollow molding, blow molding, extrusion blow molding, in-mold coating (IMC), rotational molding, laminate molding, two-color molding, insert molding, sandwich molding, foam molding, compression molding, and heat-and-cool molding with use of rapid heating die.

In this embodiment, the formed article is preferably manufactured by injection molding, wherein the resin composition of this embodiment is preferably formed in a heat insulation mold. More specifically, preferred is injection molding of the resin composition of this embodiment, with use of a mold having a ceramic layer on the cavity face; or injection molding with use of a mold having a metal layer and a thermosetting resin layer stacked in this order on the cavity face. Injection molding with use of such mold tends to improve surface smoothness of the formed article, and to further improve the transparency.

The heat insulation mold is preferably a mold having a ceramic layer on the cavity face (preferably the surface) (may be referred to as "ceramic-coated heat insulation mold", hereinafter), or a mold having a metal layer and a thermosetting resin layer stacked in this order on the cavity face (may be referred to as "resin-coated heat insulation mold", hereinafter).

The ceramic-coated heat insulation mold is exemplified by a mold having a ceramic cover plate (insert) arranged on the cavity face of the metal mold body. The ceramic, although not specifically limited so far as it excels in heat insulation, heat resistance and stability, preferably has a thermal conductivity of 5 W/m·K or smaller, and is exemplified by zirconia (zirconium oxide, $ZrO_2$). Now, zirconia may be a partially stabilized zirconia that contains, as a partial stabilizer, one kind of or two or more kinds of calcia (calcium oxide, CaO), yttria (yttrium oxide, $Y_2O_3$), magnesia (magnesium oxide, MgO), silica (silicon oxide, $SiO_2$), and ceria (cerium oxide, $CeO_2$); or may be a conductive zirconia that contains, as a conductivity-imparting agent, one kind or two or more kinds of $Fe_2O_3$, NiO, $Co_3O_4$, $Cr_2O_3$, $TiO_2$, TiN, TiC, WC, TaC and so forth.

The ceramic layer may only have the thickness enough for obtaining necessary level of heat insulation, which is normally, but not restrictively, 0.1 to 10 mm, preferably 0.5 to 10 mm, more preferably 1 to 7 mm, and even more preferably 2 to 5 mm. Too thin ceramic layer may fail in achieving a sufficient level of heat insulation, demonstrating only a small effect of improving the transparency as compared with the usual mold. Conversely, too thick ceramic layer makes the heat insulating effect excessive, needing longer time for cooling the molten resin in the cavity, and elongating the molding cycle.

The resin-coated heat insulation mold is exemplified by a mold having a metal layer arranged on the cavity face of the metal mold body, while placing a thermosetting resin layer in between. Now, the thermosetting resin layer functions not only as a heat insulating layer, but also as an adhesive layer between the mold body and the metal layer. The thermosetting resin is exemplified by epoxy acrylate resin, phenol resin, epoxy resin, melamine resin, urea resin, unsaturated polyester resin, alkyd resin, polyurethane, and thermosetting polyimide. Thermal conductivity of these thermosetting resin is approximately 0.3 to 3 W/m·K in general.

The thermosetting resin may contain inorganic particle such as glass bead, as a reinforcing material. The inorganic particle preferably has a spherical shape, with an average particle size of approximately 1 to 100 μm. The content of the inorganic particle in the thermosetting resin layer is preferably 60 to 90% by mass.

The thickness of the thermosetting resin layer is preferably around 0.2 to 1.5 mm, although depending on heat insulating property (thermal conductivity) of the thermosetting resin.

Material for composing the metal layer that constitutes the cavity face is specifically exemplified by steel materials such as alloy tool steel, die steel, tool steel, and martensitic stainless steel; and film of chromium, zinc, nickel or diamond. Preferred is a steel material treated typically by hardening. The thickness of the metal layer is normally around 0.2 to 1.5 mm.

Although the metal layer may be formed on the surface of the thermosetting resin layer typically by plating, a thin sheet of hardened steel for example may be adhered with use of the thermosetting resin.

An optional reinforcing layer made of ceramic may be formed between the metal layer and the thermosetting resin layer.

Molding conditions for injection molding of the resin composition of this embodiment applicable herein typically include a cylinder temperature of an injection molding machine of 280 to 320° C., and a mold temperature of 60 to 100° C., regardless of types of the mold.

EXAMPLES

This invention will further be detailed referring to Examples. All materials, amounts of consumption, ratios, process details and procedures described in Examples below may suitably be modified, without departing from the spirit of this invention. Hence, the scope of this invention is by no means limited to specific Examples below.

In a case where any measuring instrument used in Examples become unavailable typically due to discontinuation, the measurement may be conducted with use of other instrument having equivalent performances.

1. Raw Materials

<Exemplary Production 1: Production of Polycarbonate Resin A1-1>

Into an aluminum (SUS) reactor (internal volume: 10 L) equipped with a stirrer and a distillate condenser, placed were 26.14 mol (6.75 kg) of bisphenol C (BPC), and 26.79 mol (5.74 kg) of diphenylcarbonate, then the inside of the reactor was replaced with nitrogen gas, and the content was heated in a nitrogen gas atmosphere up to 220° C., over 30 minutes.

Next, the reaction liquid in the reactor was stirred to keep the molten state, to which cesium carbonate ($Cs_2CO_3$) as a transesterification catalyst was added, while adjusting the content thereof to $1.5\times10^{-6}$ mol per 1 mol of BPC, and the reaction liquid was stirred for ripening, in a nitrogen gas atmosphere at 220° C. for 30 minutes. Next, the pressure in the reactor was reduced down to 100 Torr over 40 minutes, with the temperature kept unchanged, and the reaction was further allowed to proceed for 100 minute, to distill phenol off.

Next, the temperature inside the reactor was elevated up to 284° C. over 60 minutes, and concurrently decompressed down to 3 Torr, to distill off nearly whole of the theoretical distillation volume of phenol. Next, the pressure inside the reactor was kept below 1 Torr with the temperature kept unchanged, the reaction was further allowed to proceed for 60 minutes, and the polycondensation reaction was terminated. The rotating speed of the stirrer was 38 rpm, the temperature of the reaction liquid immediately before the end of reaction was 289° C., and the stirring power was 1.00 kW.

Next, the reaction liquid kept in the molten state was fed to a twin-screw extruder, butyl p-toluenesulfonate which amounts 4 times the mole amount of cesium carbonate was fed through a first feed port of the twin-screw extruder and kneaded with the reaction liquid, the content was then extruded through a die of the twin-screw extruder into strand, and the strand was cut with a cutter to obtain pellet of polycarbonate resin A1-1.

<Exemplary Production 2: Production of Polycarbonate Resin A1-2>

Into an aluminum (SUS) reactor (internal volume: 10 L) equipped with a stirrer and a distillate condenser, placed were 26.14 mol (6.75 kg) of bisphenol C (BPC), and 26.79 mol (5.74 kg) of diphenylcarbonate, then the inside of the reactor was replaced with nitrogen gas, and the content was heated in a nitrogen gas atmosphere up to 220° C., over 30 minutes.

Next, the reaction liquid in the reactor was stirred to keep the molten state, to which cesium carbonate ($Cs_2CO_3$) as a transesterification catalyst was added, while adjusting the content thereof to $1.5\times10^{-6}$ mol per 1 mol of BPC, and the reaction liquid was stirred for ripening, in a nitrogen gas atmosphere at 220° C. for 30 minutes. Next, the pressure in the reactor was reduced down to 100 Torr over 40 minutes, with the temperature kept unchanged, and the reaction was further allowed to proceed for 100 minute, to distill phenol off.

Next, the temperature inside the reactor was elevated up to 284° C. over 60 minutes, and concurrently decompressed down to 3 Torr, to distill off nearly whole of the theoretical distillation volume of phenol. Next, the pressure inside the reactor was kept below 1 Torr with the temperature kept unchanged, the reaction was further allowed to proceed for 60 minutes, and the polycondensation reaction was terminated. The rotating speed of the stirrer was 38 rpm, the temperature of the reaction liquid immediately before the end of reaction was 289° C., and the stirring power was 0.60 kW.

Next, the reaction liquid kept in the molten state was fed to a twin-screw extruder, butyl p-toluenesulfonate which amounts 4 times the mole amount of cesium carbonate was fed through a first feed port of the twin-screw extruder and kneaded with the reaction liquid, the content was then extruded through a die of the twin-screw extruder into strand, and the strand was cut with a cutter to obtain pellet of polycarbonate resin A1-2.

<Exemplary Production 3: Production of Polycarbonate Resin A3-1>

Fifty mol of 2,2-bis(4-hydroxyphenyl)propane, 50 mol of 2,2-bis(4-hydroxy-3-methylphenyl)cyclohexane, 103 mol of diphenylcarbonate (DPC), and $1.5\times10^{6}$ mol of cesium carbonate (Cat) as a catalyst were precisely weighed, to obtain a mixture. Next, the mixture was placed in a first reactor equipped with a stirrer, a heat medium jacket, a vacuum pump, and a reflux condenser.

Thereafter, the procedures were conducted in the same way as in the case with polycarbonate resin (A1-1), to obtain an aromatic polycarbonate resin (A3-1).

<Exemplary Production 4: Production of Polycarbonate Resin A4-1>

Fifty mol of 2,2-bis(4-hydroxyphenyl)propane, 50 mol of 2,2-bis(4-hydroxy-3-methylphenyl)propane, 103 mol of diphenylcarbonate (DPC), and $1.5\times10^{6}$ mol of cesium carbonate (Cat) as a catalyst were precisely weighed, to obtain a mixture. Next, the mixture was placed in a first reactor equipped with a stirrer, a heat medium jacket, a vacuum pump, and a reflux condenser.

Thereafter, the procedures were conducted in the same way as in the case with polycarbonate resin (A1-1), to obtain an aromatic polycarbonate resin (A4-1).

The raw materials listed in Table 1 below were used.

TABLE 1

| Component | Abbrev. | Details |
|---|---|---|
| Polycarbonate resin (A1) | A1-1 | Aromatic polycarbonate resin produced in Exemplary Production 1<br>Mv: 26,000, hardness: 2H<br>Refractive index (at 486 nm): 1.5910 |
| | A1-2 | Aromatic polycarbonate resin produced in Exemplary Production 2<br>Mv: 20,000, hardness: 2H<br>Refractive index (at 486 nm): 1.5910 |
| Polycarbonate resin (A2) | A2-1 | Aromatic polycarbonate resin produced from bisphenol A by interfacial polymerization, S-3000N from Mitsubishi Engineering-Plastics Corporation, Mv: 22,000, hardness: 2B<br>Refractive index (at 486 nm): 1.5960 |
| Polycarbonate resin (A3) | A3-1 | Copolymer-type aromatic polycarbonate resin formed between 2,2-bis-(4-hydroxyphenyl)propane and 1,1-bis-(4-hydroxy-3-methylphenyl)cyclohexane, synthesized according to Exemplary Production 3<br>Weight (mass) proportion of copolymerization = 44:56, Mv: 18,000, hardness: H<br>Refractive index (at 486 nm): 1.5981 |
| Polycarbonate resin (A4) | A4-1 | Copolymer-type aromatic polycarbonate resin formed between 2,2-bis-(4-hydroxyphenyl)propane and 2,2-bis-(4-hydroxy-3-methylphenyl) propane, synthesized according to Exemplary production 4<br>Weight (mass) proportion of copolymerization = 48:52, Mv: 18,000, hardness: H<br>Refractive index (at 486 nm): 1.5934 |
| Other thermoplastic resin (B) | B1 | (Meth)acrylate copolymer<br>Mass proportion of aromatic (meth)acrylate unit (b1) and methyl methacrylate unit (b2) b1/b2 = 33/67<br>Product name: Metablen H-880, from Mitsubishi Chemical Corporation, Mv: 14,000<br>Refractive index (at 486 nm): 1.5200 |
| Glass filler (C) | C1 | Glass fiber with oblate cross section, E-glass<br>Long diameter: 28 μm, short diameter: 7 μm, oblateness: 4, number-average fiber length: 3.0 mm<br>Product name: T511-FGF, from Nippon Electric Glass Co., Ltd.<br>Refractive index (at 486 nm): 1.5770 |

TABLE 1-continued

| Component | Abbrev. | Details |
|---|---|---|
| | C2 | Glass fiber with circular cross section, E-glass<br>Diameter: 13 μm, number-average fiber length: 3.0 mm<br>Product name: T571, from Nippon Electric Glass Co., Ltd.<br>Refractive index (at 486 nm): 1.5780 |
| | C3 | Glass fiber with oblate cross section, E-glass<br>Long diameter: 28 μm, short diameter: 7 μm, oblateness: 4, number-average fiber length: 3.0 mm<br>Product name: CSG-3PA-830S, from Nitto Boseki Co., Ltd.<br>Refractive index (at 486 nm): 1.5650 |
| Ester compound (D) | D1 | Pentaerythritol tetrastearate<br>Product name: Loxiol VPG861, from Cognis Japan Ltd. |
| | D2 | Behenyl behenate<br>Product name: Unistar M-2222SL, from NOF Corporation |
| Stabilizer (E) | E1 | Hindered phenol-based stabilizer<br>Octadecyl-3-(3,5-di-tert-butyl-4-hydroxyphenyl) propionate<br>Product name: Irganox 1076, from BASF SE |

<Measurement of Viscosity-Average Molecular Weight (Mv) of Polycarbonate Resin>

The viscosity-average molecular weight (Mv) of the polycarbonate resin was determined by finding limiting viscosity (η) (in dL/g) with use of methylene chloride as a solvent, and an Ubbelohde viscometer at 20° C., followed by calculation from the Schnell's viscosity equation below.

$$\eta=1.23\times10^{-4}\ Mv^{0.83}$$

<Measurement of Pencil Hardness of Polycarbonate Resin>

The polycarbonate resin pellet was dried at 100° C. for 5 hours, and then injection-molded into a flat specimen (90 mm×50 mm×2 mm thick) with use of an injection molding machine ("J55-60H", from Japan Steel Works, Ltd.), at a cylinder preset temperature of 280° C., a mold temperature of 80° C., a screw speed of 100 rpm, and an injection speed of 100 mm/s.

The thus obtained flat specimen (90 mm×50 mm×2 mm thick) was subjected to measurement of pencil hardness, in compliance with ISO 15184, with use of a pencil hardness tester under a 750 g load.

The pencil hardness tester used here was a product from Toyo Seiki Seisaku-sho, Ltd.

<Weight-Average Molecular Weight (Mw) of (Meth)acrylate Polymer>

The weight-average molecular weight of the (meth)acrylate polymer was defined by polystyrene (PS) equivalent value, obtainable by gel permeation chromatography with chloroform used as a solvent.

2. Example 1 to Example 22, Comparative Example 1 to Comparative Example 7

<Production of Resin Composition Pellet>

The individual components listed in Table 1 (excluding glass filler) were blended according to the ratio summarized in Tables 2 to 6 below (all in parts by mass, unless otherwise specifically noted), the mixture was homogeneously kneaded in a tumbler mixer, fed into a single-vented, twin-screw extruder (TEM26SX, from Toshiba Machine Co., Ltd.) through a feeder on the upstream side, and, the glass filler was fed at the middle of the barrel (at a ⅗ length position of the barrel length L, away from the hopper part on the upstream side towards the downstream side), the mixture was then fed into the extruder through the barrel on the upstream side of the extruder, at a cylinder preset temperature of 260° C., a screw speed of 250 rpm, and an injection volume of 25 kg/h for melt-kneading, to obtain a resin composition pellet.

Note that Comparative Examples 6 and 7 failed in production of pellet, due to feeding failure to the hopper.

<Haze (Common Mold, 80° C.)>

The thus obtained resin composition pellet was dried at 100° C. for 5 hours, and then injection-molded into a flat specimen (90 mm×50 mm×2 mm thick) with use of an injection molding machine ("J55-60H", from Japan Steel Works, Ltd.), at a cylinder preset temperature of 280° C., a mold temperature of 80° C., a screw speed of 100 rpm, and an injection speed of 100 mm/s.

The thus obtained flat specimen was subjected to measurement of haze in compliance with JIS K7105, with use of a haze meter at 23° C.

The haze meter used here was NDH-4000 from Nippon Denshoku Industries Co., Ltd.

Haze was expressed in %.

Note that Example 21 and Example 22 were examined by measuring the flat specimens after providing thereon the hard coat layer.

<Haze (Heat Insulation Mold, 100° C.)>

The thus obtained resin composition pellet was dried at 100° C. for 5 hours, and then injection-molded into a flat specimen (80 mm×30 mm×2 mm thick) with use of an injection molding machine ("J55-60H", from Japan Steel Works, Ltd.), at a cylinder preset temperature of 290° C., a mold temperature of 100° C., a screw speed of 100 rpm, and an injection speed of 100 mm/s. The mold used here was a heat insulation mold having a 80 mm×30 mm×3 mm zirconium oxide ($ZrO_2$) plate, provided on the surface of each of the fixed cavity and mobile cavity.

The thus obtained flat specimen was subjected to measurement of haze at 23° C., in compliance with JIS K7105, with use of a haze meter.

The haze meter used here was NDH-4000 from Nippon Denshoku Industries Co., Ltd.

Haze was expressed in %.

Note that Example 21 and Example 22 were examined by measuring the flat specimens after providing thereon the hard coat layer.

<Flexural Modulus>

The thus obtained resin composition pellet was dried at 100° C. for 5 hours or longer, and then injection-molded into an ISO multipurpose specimen (4 mm thick) with use of an injection molding machine ("Si-80-6S" from Toyo Machinery & Metal Co., Ltd.), at a cylinder preset temperature of 280° C., a mold temperature of 70° C., and a molding cycle of 50 seconds.

The obtained ISO multipurpose specimen was worked at both ends thereof into a shape in compliance with ISO 178, and then subjected to bending test at 23° C. in compliance with ISO 178, to measure flexural modulus (in MPa).

<Coefficient of Dynamic Friction>

The resin composition pellet, produced in the same way as in each of the individual Examples and Comparative Examples, except that the glass filler was not blended, was dried at 100° C. for 5 hours, and then injection-molded into a flat specimen (100 mm×100 mm×2 mm thick), with use of an injection molding machine ("J55-60H", from Japan Steel Works, Ltd.), at a cylinder preset temperature of 280° C., a mold temperature of 80° C., a screw speed of 100 rpm, and an injection speed of 25 mm/s.

The thus obtained flat specimen was scanned with a 1 mm diameter spherical chip of a scratch tester, in compliance with ISO 19252, at a test speed of 100 mm/sec over a test range of 100 mm while varying the vertical load from 1 N to 50 N. The horizontal load and the vertical load were measured at a 30 N load point, and the coefficient of dynamic friction (horizontal load/vertical load) was determined. The smaller the coefficient of dynamic friction, the better.

The scratch tester used here was a product from Kato Tech Co., Ltd.

<Measurement of Pencil Hardness of Resin Composition>

The resin composition pellet was dried at 100° C. for 5 hours, and then injection-molded into a flat specimen (90 mm×50 mm×2 mm thick) with use of an injection molding machine ("J55-60H", from Japan Steel Works, Ltd.), at a cylinder preset temperature of 280° C., a mold temperature of 80° C., a screw speed of 100 rpm, and an injection speed of 100 mm/s.

The thus obtained test specimen was subjected to measurement of pencil hardness, in compliance with ISO 15184, with use of a pencil hardness tester under a 750 g load.

The pencil hardness tester used here was a product from Toyo Seiki Seisaku-sho, Ltd.

<Dielectric Loss Tangent>

Dielectric loss tangent was measured with use of a flat specimen produced from the resin composition pellet, at 1 GHz frequency by the perturbation method.

More specifically, the thus obtained resin composition pellet was dried at 100° C. for 5 hours, and then injection-molded into a flat specimen (100 mm×100 mm×2.0 mm thick) with use of an injection molding machine ("J55-60H", from Japan Steel Works, Ltd.), at a cylinder preset temperature of 280° C., a mold temperature of 80° C., a screw speed of 100 rpm, and an injection speed of 100 mm/s.

The obtained flat specimen was further machined into a 100 mm×2.0 mm×1 mm flat specimen, which was then subjected to measurement of dielectric loss tangent at 1 GHz frequency by the perturbation method.

The measurement was conducted with use of a network analyzer from Keysight Technologies, and a cavity resonator from Kanto Electronics Application & Development Inc.

<Method for Measuring Refractive Index>

The refractive indices of the resin component and glass filler were measured as described below.

The refractive index of the resin component was measured as follows.

A flat specimen which will be described later was subjected to measurement of refractive index at 486 nm.

The measurement of refractive index was conducted with use of "MODEL 2010 Prism Coupler" from Seki Technotron Corporation.

The flat specimen (90 mm×50 mm×1 mm thick) used for the measurement of refractive index was manufactured by producing a resin composition pellet same as the aforementioned resin composition pellet but excluding the glass filler, drying the pellet at 100° C. for 5 hours, and injection-molding the pellet with use of an injection molding machine ("J55-60H", from Japan Steel Works, Ltd.), at a cylinder preset temperature of 280° C., a mold temperature of 80° C., a screw speed of 100 rpm, and an injection speed of 100 mm/s.

The refractive index of the glass filler was determined by subtracting the refractive index of the resin component, from the refractive index of the resin composition (a mixture of the resin component and the glass filler).

From the thus determined refractive indices, also a difference of refractive index (refractive index of the resin component, minus, refractive index of the glass filler) was calculated.

Formation of Hard Coat Layer (Example 21, Example 22)

A hard coat layer was provided to a formed article (test specimen) obtained from each of Example 21 and Example 22.

On one face of a flat specimen, manufactured in the same way as the flat specimen (90 mm×50 mm×2 mm thick) for use in the measurement of pencil hardness, a hard coat agent was coated with use of a bar coater, the coating was heated in an infrared drying oven at 60° C. for 90 seconds to vaporize the solvent off, and then cured with UV light under a high-pressure mercury lamp at a cumulative irradiation of 1000 mJ/$cm^2$, to obtain a flat specimen having formed thereon a 10 μm thick hard coat layer. For double-sided hard coating, a 10 μm thick hard coat layer was similarly formed also on the back face.

The hard coat agent used here was a light-resistant hard coat agent (GWH-101M, from Arakawa Chemical Industries, Ltd.) for Example 21, and high-hardness hard coat agent (Beamset 907LZ, from Arakawa Chemical Industries, Ltd.) for Example 22.

<Measurement of Surface Roughness Ra of Formed Article>

A test specimen manufactured in the same way as the flat specimen (90 mm×50 mm×2 mm thick) formed for the aforementioned measurement of pencil hardness was subjected to measurement of surface roughness Ra, with use of a SURFCOM 3000A from Tokyo Seimitsu Co., Ltd., at a cutoff wavelength λc of 0.8 mm, in a Gaussian cutoff mode, at a λs of 2.67 μm, and at an evaluation length of 8 mm. The smaller the Ra, the smoother the surface of the formed article. The Ra is preferably set to 0.5 μm or smaller, in order to obtain the formed article with high transparency.

Note that Example 21 and Example 22 were examined by measuring the flat specimens after providing thereon the hard coat layer.

TABLE 2

| | | Examples | | | | | |
|---|---|---|---|---|---|---|---|
| | | 1 | 2 | 3 | 4 | 5 | 6 |
| Polycarbonate resin (A1) | A1-1 | 75 | 80 | | 85 | 81 | 81 |
| | A1-2 | | | 80 | | | |
| Polycarbonate resin (A2) | A2-1 | | | | | | |
| Polycarbonate resin (A3) | A3-1 | | | | | | |
| Polycarbonate resin (A4) | A4-1 | | | | | | |
| Other thermoplastic resin (B) | B 1 | 25 | 20 | 20 | 15 | 19 | 19 |
| Glass filler (C) | C1 | 25 | 25 | 25 | 25 | 11 | 43 |
| | C2 | | | | | | |
| | C3 | | | | | | |
| Ester compound (D) | D1 | 0.2 | 0.2 | 0.2 | 0.2 | 0.2 | 0.2 |
| | D2 | | | | | | |
| Stabilizer (E) | E1 | 0.1 | 0.1 | 0.1 | 0.1 | 0.1 | 0.1 |
| Haze (normal mold, 80° C.) [%] | | 39 | 34 | 34 | 36 | 21 | 40 |
| Haze (heat insulation mold, 100° C.) [%] | | 19 | 6 | 7 | 8 | 4 | 12 |
| Flexural modulus (MPa) | | 7100 | 7100 | 6900 | 6800 | 5000 | 9600 |
| Coefficient of dynamic friction | | 0.33 | 0.32 | 0.32 | 0.32 | 0.32 | 0.32 |
| Pencil hardness | | 4H | 4H | 4H | 4H | 4H | 4H |
| Dielectric loss tangent | | 0.0041 | 0.0038 | 0.0037 | 0.0035 | 0.0033 | 0.0041 |
| Refractive index of resin component | | 1.5728 | 1.5764 | 1.5764 | 1.5799 | 1.5772 | 1.5774 |
| Refractive index of glass filler | | 1.5770 | 1.5770 | 1.5770 | 1.5770 | 1.5770 | 1.5770 |
| Difference in refractive index (absolute value) | | 0.0042 | 0.0006 | 0.0006 | 0.0029 | 0.0002 | 0.0004 |
| Surface rougness of formed article | | 0.32 | 0.30 | 0.37 | 0.26 | 0.14 | 0.49 |

TABLE 3

| | | Example | | | | |
|---|---|---|---|---|---|---|
| | | 7 | 8 | 9 | 10 | 11 |
| Polycarbonate resin (A1) | A1-1 | 82 | 16 | 32 | 42.5 | 55 |
| | A1-2 | | | | | |
| Polycarbonate resin (A2) | A2-1 | | 64 | 48 | 37.5 | 25 |
| Polycarbonate resin (A3) | A3-1 | | | | | |
| Polycarbonate resin (A4) | A4-1 | | | | | |
| Other thermoplastic resin (B) | B 1 | 18 | 20 | 20 | 20 | 20 |
| Glass filler (C) | C1 | 67 | 25 | 25 | 25 | 25 |
| | C2 | | | | | |
| | C3 | | | | | |
| Ester compound (D) | D1 | 0.2 | 0.2 | 0.2 | 0.2 | 0.2 |
| | D2 | | | | | |
| Stabilizer (E) | E1 | 0.1 | 0.1 | 0.1 | 0.1 | 0.1 |
| Haze (normal mold, 80° C.) [%] | | 42 | 46 | 41 | 40 | 37 |
| Haze (heat insulation mold, 100° C.) [%] | | 18 | 12 | 8 | 6 | 6 |
| Flexural modulus (MPa) | | 12500 | 6700 | 6600 | 6900 | 7000 |
| Coefficient of dynamic friction | | 0.32 | 0.36 | 0.35 | 0.34 | 0.33 |
| Pencil hardness | | 4H | H | 2H | 3H | 3H |
| Dielectric loss tangent | | 0.0046 | 0.0055 | 0.0051 | 0.0048 | 0.0044 |
| Refractive index of resin component | | 1.5776 | 1.5801 | 1.5792 | 1.5786 | 1.5778 |
| Refractive index of glass filler | | 1.5770 | 1.5770 | 1.5770 | 1.5770 | 1.5770 |
| Difference in refractive index (absolute value) | | 0.0006 | 0.0031 | 0.0022 | 0.0016 | 0.0008 |
| Surface rougness of formed article | | 0.65 | 0.37 | 0.31 | 0.37 | 0.29 |

TABLE 4

| | | Examples | | | | |
|---|---|---|---|---|---|---|
| | | 12 | 13 | 14 | 15 | 16 |
| Polycarbonate resin (A1) | A1-1 | 80 | 80 | 80 | 81 | 85 |
| | A1-2 | | | | | |
| Polycarbonate resin (A2) | A2-1 | | | | | |
| Polycarbonate resin (A3) | A3-1 | | | | | |
| Polycarbonate resin (A4) | A4-1 | | | | | |
| Other thermoplastic resin (B) | B 1 | 20 | 20 | 20 | 19 | 15 |
| Glass filler (C) | C1 | 25 | 25 | 25 | | |
| | C2 | | | | 25 | 25 |
| | C3 | | | | | |

TABLE 4-continued

| | | Examples | | | | |
|---|---|---|---|---|---|---|
| | | 12 | 13 | 14 | 15 | 16 |
| Ester compound (D) | D1 | 1.0 | | | 0.2 | 0.2 |
| | D2 | | 1.0 | 2.0 | | |
| Stabilizer (E) | E1 | 0.1 | 0.1 | 0.1 | 0.1 | 0.1 |
| Haze (normal mold, 80° C.) [%] | | 32 | 27 | 24 | 40 | 42 |
| Haze (heat insulation mold, 100° C.) [%] | | 9 | 8 | 15 | 14 | 12 |
| Flexural modulus (MPa) | | 7000 | 6900 | 7000 | 7000 | 7000 |
| Coefficient of dynamic friction | | 0.32 | 0.32 | 0.32 | 0.32 | 0.32 |
| Pencil hardness | | 4H | 4H | 4H | 4H | 4H |
| Dielectric loss tangent | | 0.0039 | 0.0039 | 0.004 | 0.0036 | 0.0035 |
| Refractive index of resin component | | 1.5764 | 1.5764 | 1.5764 | 1.5773 | 1.5799 |
| Refractive index of glass filler | | 1.5770 | 1.5770 | 1.5770 | 1.5782 | 1.5782 |
| Difference in refractive index (absolute value) | | 0.0006 | 0.0006 | 0.0006 | 0.0009 | 0.0017 |
| Surface rougness of formed article | | 0.27 | 0.17 | 0.12 | 0.27 | 0.27 |

TABLE 5

| | | Examples | | | | | |
|---|---|---|---|---|---|---|---|
| | | 17 | 18 | 19 | 20 | 21 | 22 |
| Polycarbonate resin (A1) | A1-1 | 60 | 62 | | | 80 | 80 |
| | A1-2 | | | | | | |
| Polycarbonate resin (A2) | A2-1 | | | | | | |
| Polycarbonate resin (A3) | A3-1 | | | 77 | | | |
| Polycarbonate resin (A4) | A4-1 | | | | 77.5 | | |
| Other thermoplastic resin (B) | B 1 | 40 | 38 | 23 | 22.5 | 20 | 20 |
| Glass filler (C) | C1 | | | | | 25 | 25 |
| | C2 | | | 25 | 25 | | |
| | C3 | 25 | 25 | | | | |
| Ester compound (D) | D1 | 0.2 | 0.2 | 0.2 | 0.2 | 0.2 | 0.2 |
| | D2 | | | | | | |
| Stabilizer (E) | E1 | 0.1 | 0.1 | 0.1 | 0.1 | 0.1 | 0.1 |
| Haze (normal mold, 80° C.) [%] | | 29 | 35 | 40 | 45 | 24 | 24 |
| Haze (heat insulation mold, 100° C.) [%] | | 7 | 7 | 15 | 15 | — | — |
| Flexural modulus (MPa) | | 7100 | 7100 | 6800 | 6800 | 7100 | 7100 |
| Coefficient of dynamic friction | | 0.39 | 0.38 | 0.36 | 0.39 | 0.32 | 0.32 |
| Pencil hardness | | 5H | 5H | 4H | 3H | 4H | 6H |
| Dielectric loss tangent | | 0.0043 | 0.0041 | 0.0045 | 0.0045 | 0.0038 | 0.0038 |
| Refractive index of resin component | | 1.5626 | 1.5640 | 1.5801 | 1.5768 | 1.5764 | 1.576386 |
| Refractive index of glass filler | | 1.5650 | 1.5650 | 1.5770 | 1.5770 | 1.5770 | 1.5770 |
| Difference in refractive index (absolute value) | | 0.0024 | 0.0010 | 0.0031 | 0.0002 | 0.0006 | 0.0006 |
| Surface rougness of formed article | | 0.26 | 0.26 | 0.45 | 0.43 | 0.07 | 0.02 |

TABLE 6

| | | Comparative Examples | | | | | | |
|---|---|---|---|---|---|---|---|---|
| | | 1 | 2 | 3 | 4 | 5 | 6 | 7 |
| Polycarbonate resin (A1) | A1-1 | | | 60 | 90 | 80 | 40 | |
| | A1-2 | | | | | | | |
| Polycarbonate resin (A2) | A2-1 | 81 | 90 | | | | | 40 |
| Polycarbonate resin (A3) | A3-1 | | | | | | | |
| Polycarbonate resin (A4) | A4-1 | | | | | | | |
| Other thermoplastic resin (B) | B 1 | 19 | 10 | 40 | 10 | 20 | 60 | 60 |
| Glass filler (C) | C1 | 25 | 25 | 25 | 25 | 0 | | |
| | C2 | | | | | | | |
| | C3 | | | | | | 25 | 25 |
| Ester compound (D) | D1 | 0.2 | 0.2 | 0.2 | 0.2 | 0.2 | 0.2 | 0.2 |
| | D2 | | | | | | | |
| Stabilizer (E) | E1 | 0.1 | 0.1 | 0.1 | 0.1 | 0.1 | 0.1 | 0.1 |
| Haze (normal mold, 80° C.) [%] | | 60 | 74 | 70 | 52 | 0.8 | cloudy white | cloudy white |
| Haze (heat insulation mold, 100° C.) [%] | | — | — | — | — | — | — | — |
| Flexural modulus (MPa) | | 6700 | 7100 | 7200 | 7100 | 2900 | | |
| Coefficient of dynamic friction | | 0.41 | 0.42 | 0.33 | 0.31 | 0.33 | | |
| Pencil hardness | | H | H | 4H | 4H | 2H | | |

TABLE 6-continued

| | Comparative Examples | | | | | | |
|---|---|---|---|---|---|---|---|
| | 1 | 2 | 3 | 4 | 5 | 6 | 7 |
| Dielectric loss tangent | 0.0064 | 0.0067 | 0.0047 | 0.0034 | 0.003 | | |
| Refractive index of resin component | 1.5820 | 1.5887 | 1.5622 | 1.5835 | 1.5764 | 1.5481 | 1.5504 |
| Refractive index of glass filler | 1.5770 | 1.5770 | 1.5770 | 1.5770 | — | 1.5650 | 1.5650 |
| Difference in refractive index (absolute value) | 0.0050 | 0.0117 | 0.0148 | 0.0065 | — | 0.0169 | 0.0146 |
| Surface rougness of formed article | 0.58 | 0.56 | 0.24 | 0.24 | 0.05 | | |

"Difference in refractive index (absolute)" in Tables above denotes an absolute difference between the refractive index of the resin component and the refractive index of the glass filler.

As is clear from the results above, the formed articles formed of the resin composition of this invention were found to excel in the transparency and mechanical strength (Examples 1 to 22). They also demonstrated good formability, high pencil hardness, and low dielectric loss tangent.

The invention claimed is:

1. A resin composition, comprising: containing a resin component; and a glass filler in a range of from 5 to 100 parts by mass, per 100 parts by mass of the resin component, wherein the resin component comprises a polycarbonate resin in a range of from 40 to 85 parts by mass, and a (meth)acrylate polymer in a range of from 15 to 60 parts by mass, wherein the resin component and the glass filler have an absolute difference in refractive index of 0.0042 or smaller, wherein the resin component has a coefficient of dynamic friction, measured in compliance with ISO 19252, of 0.40 or smaller, wherein the polycarbonate resin comprises a first structural unit of formula (1):

(1)

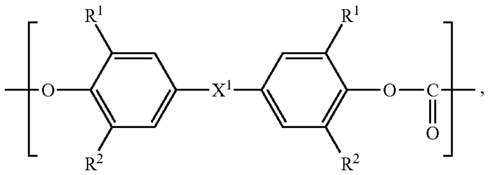

$R^1$ being a methyl group, $R^2$ being a hydrogen atom or a methyl group, and $X^1$ being

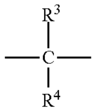
or
,

$R^3$ and $R^4$ independently being a hydrogen atom or a methyl group, and Z being a group that combines with C to form an optionally-substituted alicyclic hydrocarbon group having 6 to 12 carbon atoms, and wherein the (meth)acrylate polymer comprises an aromatic (meth)acrylate unit (b1) and a methyl methacrylate unit (b2), with a (b1/b2) mass ratio in a range of from 5 to 80/95 to 20.

2. The resin composition of claim 1, wherein the polycarbonate resin further comprises a second structural unit of formula (2):

(2)

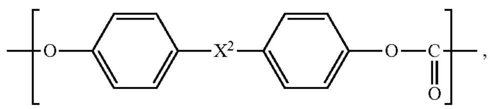

$X^2$ being;

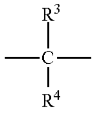
or
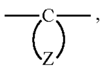
,
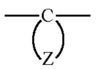

$R^3$ and $R^4$ independently being a hydrogen atom or a methyl group, and Z being a group that combines with C to form an optionally-substituted alicyclic hydrocarbon group having 6 to 12 carbon atoms.

3. The resin composition of claim 1, wherein the (meth) acrylate polymer has a refractive index in a range of from 1.4900 to 1.5500.

4. The resin composition of claim 1, wherein the resin component comprises of the structural unit of formula (1) in 15% by mass or more.

5. The resin composition of claim 1, wherein the (meth) acrylate polymer comprises an aromatic (meth)acrylate unit (b1).

6. The resin composition of claim 1, wherein the (meth) acrylate polymer contains-comprises an aromatic (meth) acrylate unit (b1) and a methyl methacrylate unit (b2), with a (b1/b2) mass ratio in a range of from 5 to 50/50 to 95.

7. The resin composition of claim 1, wherein the glass filler comprises a glass fiber having an oblate cross section.

8. The resin composition of claim 1, demonstrating a dielectric loss tangent, measured by the perturbation method at 1 GHz frequency, of 0.0060 or smaller.

9. The resin composition of claim 1, comprising the glass filler in a range of from 10 to 100 parts by mass, per 100 parts by mass of the resin component, wherein the resin component comprises the (meth)acrylate polymer in a range of from 16 to 40 parts by mass, relative to a total mass of the polycarbonate resin and the second thermoplastic resin assumed to be 100 parts by mass.

10. A formed article, comprising:

the resin composition of claim 1.

11. A display utensil, a personal digital assistant component, an electric home appliance, or interior furniture, comprising:

the resin composition of claim 1.

12. A formed article with hard coat layer, comprising:

the formed article comprising the resin composition of claim 1; and a hard coat layer on at least a part of the formed article.

13. The resin composition of claim 1, wherein the (meth)acrylate polymer comprises the aromatic (meth)acrylate structural unit (b1) and the methyl methacrylate structural unit (b2) in a total amount of 90% by mass or more, relative to all structural units exclusive of terminal groups.

14. The resin composition of claim 1, wherein the polycarbonate resin has a viscosity-average molecular weight in a range of from 20,000 to 30,000.

15. The resin composition of claim 14, wherein the (meth)acrylate polymer has a weight-average molecular weight in a range of from 5,000 to 30,000.

16. A resin composition, comprising:

a resin component; and a glass filler in a range of from 5 to 100 parts by mass, per 100 parts by mass of the resin component, wherein the resin component comprises a polycarbonate resin in a range of from 40 to 85 parts by mass, and a (meth)acrylate polymer in a range of from 15 to 60 parts by mass, wherein the resin component and the glass filler have an absolute difference in refractive index of 0.0042 or smaller, wherein the resin component has a coefficient of dynamic friction, measured in compliance with ISO 19252, of 0.40 or smaller, wherein the polycarbonate resin comprises a first structural unit of formula (1) and, optionally, a second structural unit of formula (2):

(1)

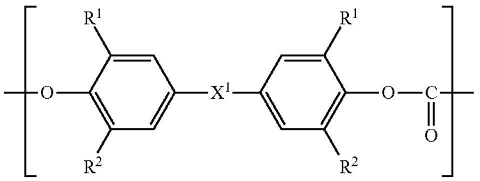

-continued (2)

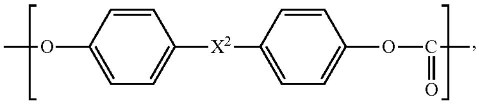

$R^1$ being a methyl group, $R^2$ being a hydrogen atom or a methyl group, and $X^1$ being

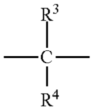

or

$R^3$ and $R^4$ independently being a hydrogen atom or a methyl group, and Z being a group that combines with C to form an optionally-substituted alicyclic hydrocarbon group having 6 to 12 carbon atoms, wherein the first structural unit and the second structural unit make out 90% by mass or more of the polycarbonate resin, relative to all polycarbonate resin structural units exclusive of terminal groups, and wherein the (meth)acrylate polymer comprises at least 90% by mass of (meth)acrylate structural units, of all (meth)acrylate polymer structural units exclusive of terminal groups.

17. The resin composition of claim 16, wherein the first structural unit and the second structural unit make out 95% by mass or more of the polycarbonate resin, relative to all structural units exclusive of terminal groups.

18. The resin composition of claim 16, wherein the first structural unit and the second structural unit make out 99% by mass or more of the polycarbonate resin, relative to all structural units exclusive of terminal groups.

19. The resin composition of claim 16, wherein the (meth)acrylate polymer comprises an aromatic (meth)acrylate unit (b1) and a methyl methacrylate unit (b2), with a (b1/b2) mass ratio in a range of from 5 to 80/95 to 20.

20. The resin composition of claim 16, wherein the (meth)acrylate polymer comprises an aromatic (meth)acrylate unit (b1) and a methyl methacrylate unit (b2), with a (b1/b2) mass ratio in a range of from 30 to 40/60 to 70.

* * * * *